United States Patent
Shen (10) Patent No.: US 8,127,104 B1
(45) Date of Patent: Feb. 28, 2012

(54) ALIGNMENT MATRIX MEMORY COPY

(75) Inventor: Han Shen, Pudong District (CN)

(73) Assignee: Marvell International Ltd., Hamilton (BM)

( * ) Notice: Subject to any disclaimer, the term of this patent is extended or adjusted under 35 U.S.C. 154(b) by 740 days.

(21) Appl. No.: 12/180,238

(22) Filed: Jul. 25, 2008

Related U.S. Application Data (60) Provisional application No. 60/954,127, filed on Aug. 6, 2007.

(51) Int. Cl.
*G06F 12/00* (2006.01)
(52) U.S. Cl. ........................ 711/201; 711/165
(58) Field of Classification Search ......................... None
See application file for complete search history.

(56) References Cited

U.S. PATENT DOCUMENTS 5,701,517 A * 12/1997 Carpenter ..................... 710/66
(Continued)

OTHER PUBLICATIONS

U.S. Appl. No. 12/726,310, filed Mar. 17, 2010, 36 pages.
(Continued)

*Primary Examiner* — Denise Tran (57) ABSTRACT

In the various embodiments, memory controllers, methods and systems are described. A system can include a memory controller configured to, compose a characteristic key from a source address and a destination address for a memory copy; and invoke a memory copy routine, wherein the memory copy routine is identified by a wrap function in an alignment matrix, the wrap function corresponding to the characteristic key.

25 Claims, 9 Drawing Sheets

U.S. PATENT DOCUMENTS

| | | | |
|---|---|---|---|
| 6,000,006 | A | 12/1999 | Bruce et al. |
| 6,539,467 | B1 | 3/2003 | Anderson et al. |
| 6,615,324 | B1 | 9/2003 | Fernald |
| 6,717,847 | B2 | 4/2004 | Chen |
| 6,876,702 | B1 | 4/2005 | Hui et al. |
| 7,038,950 | B1 | 5/2006 | Hamilton et al. |
| 7,076,631 | B2 * | 7/2006 | Herron .................. 711/201 |
| 7,284,106 | B1 | 10/2007 | Fernald |
| 7,499,343 | B2 | 3/2009 | Kang |
| 7,613,871 | B2 | 11/2009 | Tanaka et al. |
| 7,649,539 | B2 | 1/2010 | Evans et al. |
| 7,734,874 | B2 | 6/2010 | Zhang et al. |
| 7,945,825 | B2 | 5/2011 | Cohen et al. |
| 2002/0116584 | A1 | 8/2002 | Wilkerson |
| 2004/0098556 | A1 * | 5/2004 | Buxton et al. .......... 711/201 |
| 2004/0199734 | A1 | 10/2004 | Rajamani et al. |
| 2006/0010304 | A1 | 1/2006 | Homewood et al. |
| 2006/0288153 | A1 | 12/2006 | Tanaka et al. |
| 2006/0288188 | A1 * | 12/2006 | Ma et al. ................ 711/201 |
| 2007/0176939 | A1 | 8/2007 | Sadowski |
| 2007/0271609 | A1 | 11/2007 | Chen et al. |
| 2008/0126728 | A1 | 5/2008 | Fernald |
| 2008/0147978 | A1 | 6/2008 | Pesavento et al. |
| 2008/0270679 | A1 | 10/2008 | Joo |
| 2009/0113166 | A1 | 4/2009 | Houston et al. |
| 2009/0122610 | A1 | 5/2009 | Danon et al. |
| 2009/0150599 | A1 | 6/2009 | Bennett |
| 2009/0228739 | A1 | 9/2009 | Cohen et al. |

OTHER PUBLICATIONS

U.S. Appl. No. 12/862,600, filed Aug. 24, 2010, 36 pages.

"Non-Final Office Action", U.S. Appl. No. 12/276,084, (Apr. 11, 2011), 12 pages.

"Non-Final Office Action", U.S. Appl. No. 12/332,870, (Apr. 25, 2011), 15 pages.

"Non-Final Office Action", U.S. Appl. No. 12/396,250, (Jun. 23, 2011), 6 pages.

"Final Office Action", U.S. Appl. No. 12/276,084, (Oct. 17, 2011), 15 pages.

"Final Office Action", U.S. Appl. No. 12/332,870, (Oct. 12, 2011), 17 pages.

"Notice of Allowance", U.S. Appl. No. 12/396,250, (Nov. 16, 2011), 4 pages.

* cited by examiner

ALIGNMENT MATRIX MEMORY COPY

RELATED APPLICATIONS

This application claims priority to U.S. Provisional Application Ser. No. 60/954,127, under 35 U.S.C. 119(e), entitled: Alignment Matrix in Memcpy Optimization, filed on Aug. 6, 2007, the disclosure of which is incorporated by reference herein.

BACKGROUND

Memory copying is a procedure in which data from a source portion of memory storage is duplicated and placed in a destination portion within memory storage. The location of the source portion is identified by a source address and the destination portion is identified by a destination address. This procedure can be time consuming because it duplicates the data from the source portion and it aligns the duplicated data in the destination portion according to the destination address. The procedure aligns the bytes of data on a word boundary in the destination portion so that the duplicated data in the destination portion minors the alignment of the data bytes in the source portion.

A byte-by-byte copy operation can be used to ensure the proper alignment of the duplicated data in the destination portion. In a byte-by-byte copy operation, a byte of data is duplicated from the source portion at a source address and is placed within the destination portion so that the duplicated byte is aligned within the destination portion as the byte appears in the source portion. While a byte-by-byte copy operation can ensure proper alignment of the duplicated data within the destination portion, a byte-by-byte copy operation is disfavored because it is time consuming in comparison to copying multiple bytes at a time. When copying multiple bytes at a time, the alignment of the duplicated data on a word boundary is important as data corruption can occur if the data within the destination portion is not aligned to mirror the alignment within the source portion.

In order to speed up data duplication over a byte-by-byte copy operation, one of several memory copies can be used to perform the multiple byte memory copy based on the alignment of bytes on a word boundary for the source portion and the destination portion. While copying multiple bytes at a time reduces the overall time spent for a memory copy procedure, this time reduction can be off-set by the time and resources spent determining which individual memory copy is to be used. This resource burden or overhead and the associated delay is troublesome due to the frequent occurrence of memory copy procedures.

SUMMARY

This Summary is provided to introduce subject matter that is further described below in the Detailed Description and illustrated in the Drawings. Accordingly, the Summary should not be considered to describe essential features nor used to limit the scope of the claimed subject matter.

In one or more embodiments, a memory controller comprises one or more modules to: compose a characteristic key from a source address and a destination address for a memory copy; and invoke a memory copy routine to perform the memory copy, wherein the memory copy routine is identified by a wrap function in an alignment matrix, the wrap function corresponding to the characteristic key.

In one or more embodiments, a method comprises, composing a characteristic key from a source address and a destination address for a memory copy; and invoking a memory copy routine to perform the memory copy, wherein the memory copy routine is identified by a wrap function in an alignment matrix, the wrap function corresponding to the characteristic key.

In one or more embodiments, or more computer-readable storage media having instructions that are executable to: compose a characteristic key from a source address and a destination address for a memory copy; and invoke a memory copy routine to perform the memory copy, wherein the memory copy routine is identified by a wrap function in an alignment matrix, the wrap function corresponding to the characteristic key.

In one or more embodiments, a system comprises, means for storing data in an addressable manner; and means for controlling the means for storing, the means for controlling being configured to compose a characteristic key from a source address and a destination address data for a memory copy, the means for controlling invokes a memory copy routine corresponding to a wrap function designated by the characteristic key from an alignment matrix.

BRIEF DESCRIPTION OF THE DRAWINGS

The same numbers are used throughout the drawings to reference like features.

DETAILED DESCRIPTION

Overview

In various embodiments, memory systems, memory controllers, methods and computer storage media are discussed. In one or more embodiments a method includes composing a characteristic key from a source address and a destination address for a memory copy; and invoking a memory copy routine to perform the memory copy, which is identified by a wrap function in an alignment matrix, the wrap function corresponding to the characteristic key. A wrap function can provide an additional function to the base function, e.g., wraps the original function. A memory copy can include a memory copy routine and a byte-by-byte copy, if applicable, for alignment. An alignment constraint for a memory copy can be met by copying initial bytes within a boundary on a byte-by-byte basis. The characteristic key corresponds to, or otherwise designates, a wrap function. The wrap function can be included in a wrap function alignment matrix. The wrap function in-turn identifies a memory copy routine for copying data on a multiple byte basis.

For example, in at least some embodiments, a memory controller is configured to compose a characteristic key using the source address and the destination address for a memory copy. The characteristic key identifies a wrap function. The wrap function wraps (e.g., contains) a memory copy routine and an initial byte-by-byte copy for meeting an alignment constraint. An alignment constraint is a metric of the alignment of the source address and the destination address on a word boundary, e.g., meeting the alignment constraint can ensure the duplicated data is properly placed within the destination portion.

If the source address and the destination address are not aligned on a word boundary, initial boundary bytes can be copied on a byte-by-byte basis. The memory copy routine is then called on to duplicate and place the remaining data. Copying on a byte-by-byte basis can include duplicating a byte from the source portion and then placing the duplicated byte in the destination portion at the destination address corresponding to the source address for the duplicated byte. The memory copy routine can use the next address after the byte-by-byte copy as the starting address for the memory copy routine. By using the wrap function alignment matrix with a characteristic key, the time associated with the overall memory copy can be reduced. In the discussion that follows, a section entitled "Operating Environment" is provided and describes an example operating environment in which one or more embodiments can be employed. It is to be appreciated and understood that this environment is provided for context and is not to be used to limit application of the claimed subject matter to one specific environment. Rather, the inventive principles can be employed in other environments in accord with the spirit and scope of the claimed subject matter. Following this, specific environments and conditions are described for additional context.

Operating Environment

Figure 1:
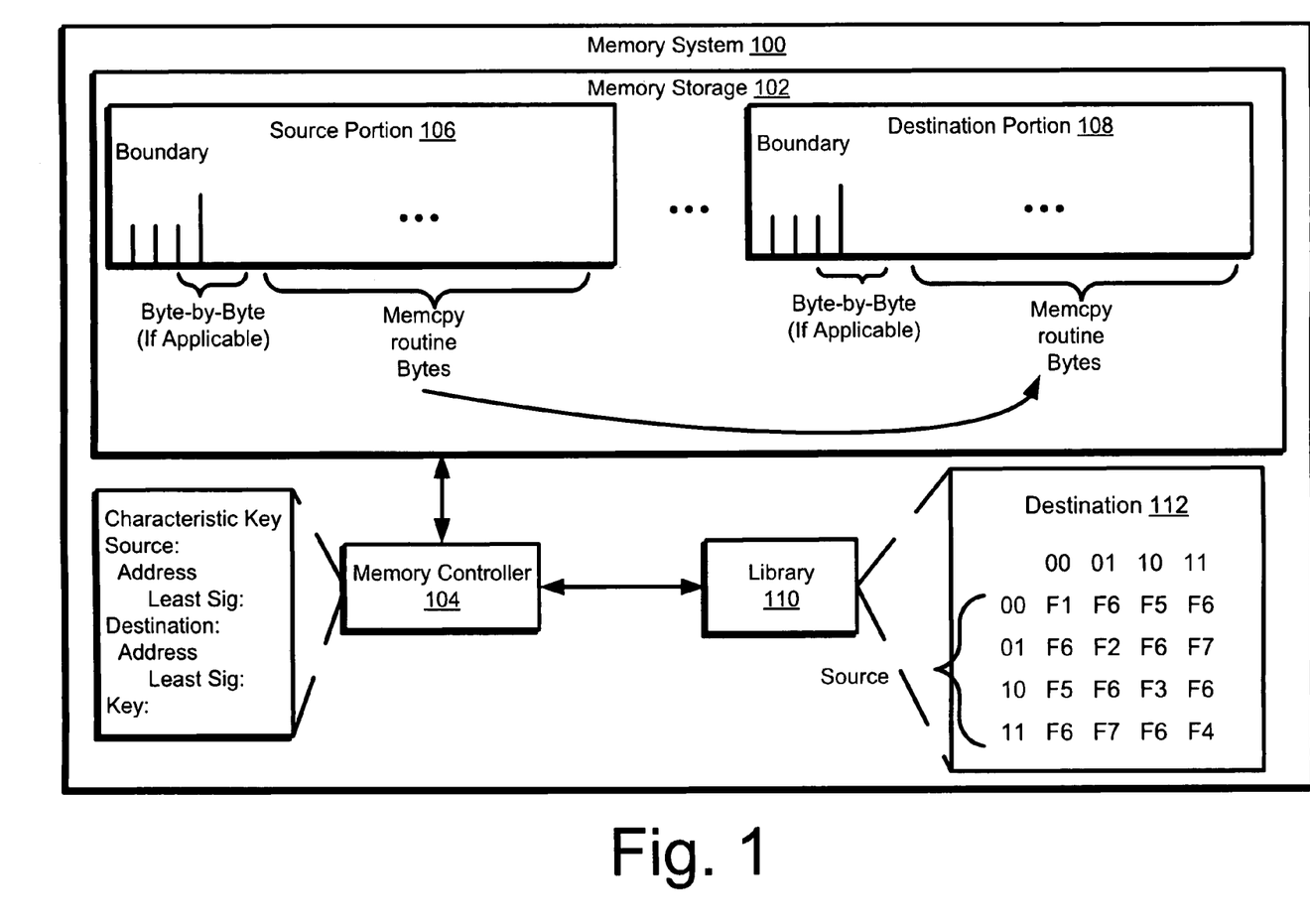
FIG. 1 illustrates a memory system in accordance with one or more embodiments.

FIG. 1 illustrates a memory system 100 in accordance with one or more embodiments. In the illustrated and described embodiments, the memory system 100 utilizes a "C" based programming language. "C" languages can be used to provide instructions for causing computing hardware to perform desired functions. In implementations, memory systems using other languages can benefit from the principles described herein.

In this implementation, the memory system 100 includes, memory storage 102 for storing data such as program data or user data. For example, memory storage 102 can be random access memory (RAM) storage connected to a central processing unit (CPU) via a 32-bit bus. While a particular configuration is discussed, an artisan will appreciate that other forms of data storage and environmental configurations are contemplated.

In one or more embodiments, a memory controller 104 can be included within memory system 100. The memory controller 104 can be formed as a separate unit or included within a memory module physically including memory storage 102. For instance, the memory controller 104 may be incorporated as hardware (e.g., in the logic included in a RAM module), firmware, software, or combinations thereof to provide functionality to manage data within memory storage 102.

The memory controller 104 may manage the data stored in memory storage 102 on behalf of a CPU. Thus, the memory controller 104 can be directed by the CPU. Typically, the memory controller 104 acts as an intermediary by managing physical placement, copying, and retrieval of data within memory storage 102 for the CPU. The memory controller 104 manages the memory storage 102 in an addressable manner. Memory storage addressing permits retrieval, storage, and manipulation including memory copying on a discrete basis. More particularly, the memory controller 104 can control how data is stored within memory storage 102 for the CPU.

One example of managing memory storage 102 is performing a memory copy. In a memory copy, data stored in a source portion 106 within memory storage 102 is duplicated so that a destination portion 108 within memory storage 102 replicates the source portion 106. However, a memory copy can be time consuming because the duplicated data should be placed in the destination portion 108 to mirror the source portion 106. For example, if the data in source portion 106 and the destination portion 108 are not aligned, the duplicated data may not match the original data when read from a starting destination address.

A memory copy that includes alignment, for instance, may be time consuming as an individual memory copy routine is selected based on the alignment of the source portion and the destination portion. The alignment of the source address for the source portion and the destination address for the destination portion on a word boundary can be used to determine which memory copy routine should be employed and whether initial byte(s) should be copied on a byte-by-byte basis. Proper selection of a memory copy helps ensure that the duplicated data is properly aligned and that the overall memory copy procedure occurs in an efficient manner. An individual memory copy can be selected based on how efficiently the individual memory copy duplicates and places the data for the given set of conditions.

Figure 2:
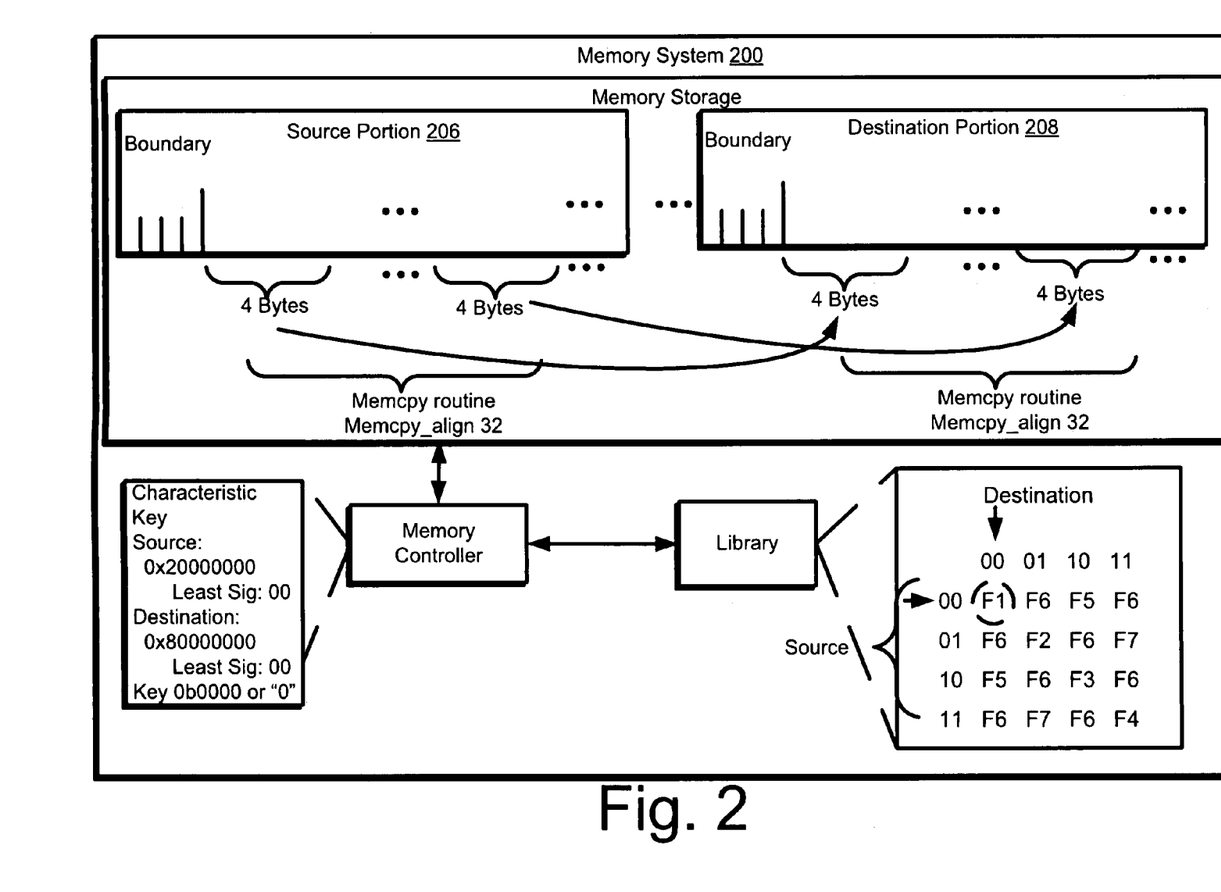
FIG. 2 illustrates a memory system in accordance with one or more embodiments for one specific set of conditions.

By way of a general example, as illustrated in FIG. 2, the source portion 206 and the destination portion 208 for the memory copy are both aligned when a source pointer and a destination pointer are aligned on a four-byte word boundary for a computing system, which uses memory system 200, with a 32 bit bus. In such an instance, the data from the source portion 206 may be duplicated and placed at 4-bytes-per-time using a memory copy routine, such as:

```
/* dest and source are both 32 bit aligned */
void * memcpy_align32(void * dest, const void * source, unsigned int len)
{
  long * pDest32=(long *) dest;
  const long * pSource32=(const long *) source;
  while (len>=4)
  {
    *pDest32++=*pSource32++;
    len-=4;
  }
  char * pDest8=(char *) pDest32;
  const char * pSource8=(const char *) pSource32;
  while (len--)
  {
    *pDest8++=*pSource8++;
  }
  return (dest);
}
```

Generally similar memory copy routines can be used for other scenarios based on the alignment of the source pointer and destination pointer for the particular memory copy scenario. For example, when the source pointer and destination pointer are aligned on a two-byte boundary, two bytes can be duplicated and placed at a time using a memcpy_align16 routine.

Referring to FIG. 1, the memory controller 104 can derive a characteristic key from the source address and the destination address for the memory copy to be performed. For instance, the characteristic key can be implemented as a four-bit value that is derived from the source address and the destination address. By way of example, and not limitation, the source address and the destination address can be logically combined, e.g., by using an "AND" operation on the source address and the destination address. Such logical operations can compose a characteristic key in which the characteristic's two most significant bits are the two least significant digits of the source address. The characteristics key's least significant digits can be implemented using the least significant digits of the destination address. In instances, the memory controller 104 conducts a mask operation and concatenation on the source address and destination address to obtain the characteristic key. The memory controller 104 can mask the address bytes which are not the two least significant digits for the source address and the destination address and concatenate the least significant digits into a four bit characteristic key which includes two bits from the source address and two bits from the destination address.

In an example, when the source address is 0x200000002 and the destination address is 0x80000001, the memory controller 104 can determine that the two least significant bits of the source address are "10" and the two least significant bits of the destination address are "01". In the previous example, the obtained characteristic key can be 0b1001 or in decimal notation "9". Expressed in "C" language:

int characteristic_key=
    ((((unsigned long)source_address) & 0x03)<<2)|
    (((unsigned long)dest_address) & 0x03)

In one or more additional embodiments, the two terminal bits from the source address or the destination address can be used in the characteristic key. In one or more embodiments, the memory controller 104 uses the characteristic key to designate a wrap function which, in-turn, identifies a memory copy for a set of conditions. For example, because the characteristic key can be derived from the source address and the destination address, these address parameters can correspond to a given set of conditions for the memory system 100.

time" and then a memory copy routine is subsequently called on to duplicate and place multiple bytes at a time. The memory controller 104 can direct the memory copy routine to use the address after the byte-by-byte copy as a starting address for placing the source portion data duplicated by the memory copy routine.

In one or more embodiments, the memory controller 104 can maintain a memory copy alignment matrix in a library 110. The memory copy alignment matrix can summarize the possible memory copies that can be used by the memory controller 104 to copy the desired data. The individual memory copies can be selected based on the memory system environment, i.e., the then existing conditions that are set for the memory system 100.

The individual memory copies can, in-turn, be identified by individual wrap functions which wrap the individual memory copy. The wrap function can be considered as a "bridge" which permits the memory controller 104 to identify which memory copy is to be used based on the composed characteristic key. For example, the memory controller 104 can determine which memory copy routine should be invoked for a given characteristic key. The memory copy alignment matrix included in library 110 can summarize the memory copies based on the memory copy's alignment constraint. For example, the memory copy alignment matrix may take into account potential source portion and destination portion alignments, examples of which are shown in the following table:

TABLE 1

Memory Copies

| Source | Destination | | | |
|---|---|---|---|---|
| | 4-byte-aligned | 1 byte over 4-byte-boundary | 2 bytes over 4-byte-boundary | 3 bytes over 4-byte boundary |
| 4-byte-aligned | memcpy_align32 | memcpy_alignx | memcpy_align16 | memcpy_alignx |
| 1 byte over 4-byte-boundary | memcpy_alignx | Read 3 bytes memcpy_align32 | memcpy_alignx | Read 1 byte memcpy_align16 |
| 2 bytes over 4-byte-boundary | memcpy_align16 | memcpy_alignx | Read 2 bytes memcpy_align32 | memcpy_alignx |
| 3 bytes over 4-byte boundary | memcpy_alignx | Read 1 byte memcpy_align16 | memcpy_alignx | Read 1 byte memcpy_align32 |

In order to describe the relationship of the characteristic key to a wrap function, a discussion of the underlying or wrapped memory copy is now described. A memory copy can include a memory copy routine and a byte-by-byte initial copy for meeting an alignment constraint. The memory copy routine can be the logical operation which is invoked to copy the data once initial bytes are aligned on a word boundary.

If the source address and the destination are aligned, the memory controller 104 can invoke a memory copy routine. For example, if the source portion 106 and destination portion 108 are both aligned on a four-byte boundary, the memory controller 104 can direct a memory copy routine to commence copying four bytes at a time. In contrast, if the source portion and the destination portion are to be aligned, the memory controller 104 can direct that the initial bytes within a boundary should be copied on a byte-per-byte basis and then the memory controller 104 calls on the memory copy routine to duplicate and place the remaining source portion data. For example, three bytes may be duplicated and placed "one at a As will be discussed below, the individual memory copies included the above memory copy alignment matrix can be reflected in a wrap function alignment matrix which is described below.

In one or more embodiments, the individual wrap function may wrap or contain a memory copy, e.g., a memory copy that is selected for its efficiency for a set of memory system conditions. For example, as illustrated in FIG. 2, if a source pointer and a destination pointer are aligned on a four-byte boundary, four bytes of the source portion can be duplicated and placed in the destination portion. Memcpy_align32 routine can be used in this scenario.

Wrap functions and a wrap function alignment matrix will now be described. Table 2 below describes example wrap functions for sample memory system conditions. An individual wrap function can be used to contain the memory copy for a given set of conditions. The memory copy can include a byte-by-byte copy for meeting the alignment constrain for the memory copy and a memory copy routine for copying the remaining data after the byte-by-byte copy.

For example, if a source portion and a destination portion have four bytes which are aligned on a four-byte boundary, the wrap function can be "F1" which corresponds to characteristic key 0b0000.

Referring to FIG. 1, the memory controller 104 can maintain a library 110, including a wrap function alignment matrix 112. This library can be a separate library as well. The memory controller 104 can use a characteristic key which corresponds to a wrap function which in-turn identifies which memory copy should be used based on the source address and the destination address. The source address and the destination address may be considered to reflect the then existing conditions of the memory system 100 including memory storage 102.

The memory controller 104 uses the wrap function alignment matrix 112 to identify which memory copy corresponds to the included wrap function and the characteristic key. A wrap function can provide an additional function to the base function, e.g., wraps the original function. In the present example, the wrap function can be used to coordinate a characteristic key to a memory copy.

TABLE 2

Wrap Functions

| Source | Destination | | | |
|---|---|---|---|---|
| | 00 | 01 | 10 | 11 |
| 00 | F1 | F6 | F5 | F6 |
| 01 | F6 | F2 | F6 | F7 |
| 10 | F5 | F6 | F3 | F6 |
| 11 | F6 | F7 | F6 | F4 |

The wrap function alignment matrix 112, which includes individual wrap function within the individual cells, can be expressed as a one-dimension array, an example of which in the "C" language is as follows:

```
// definitions for F1, F2, F4~F7 is omitted here
void * F3(void * dest , const void * src , unsigned int n)
{
char * d=(char *)dest;
char * s=(char *)src;
*(d++)=*(s++);
*(d++)=*(s++);
return memcpy_align32(d, s, n–2);
}
typedef void * (*memcpy_funcptr)(void *dest, const void *src, unsigned int);
static memcpy_funcptr memcpy_func_matrix[16]=
{
F1,F6,F5,F6,
F6,F2,F6,F7,
F5,F6,F3,F6,
F6,F7,F6,F4
};
```

Expressing the wrap function alignment matrix 112 as a one-dimensional array can reduce overhead (both in processing and in time) associated with meeting the alignment constraint for a given set of memory system 100 conditions. In one or more embodiments, the alignment matrix is a four-by-four matrix in which the individual cells represent one of seven functions.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware or a combination thereof. The features of the memory copy techniques described below are platform-independent, meaning that the techniques may be implemented on a variety of commercial computing platforms having a variety of processors and memory.

Implementation Example

Figure 3:
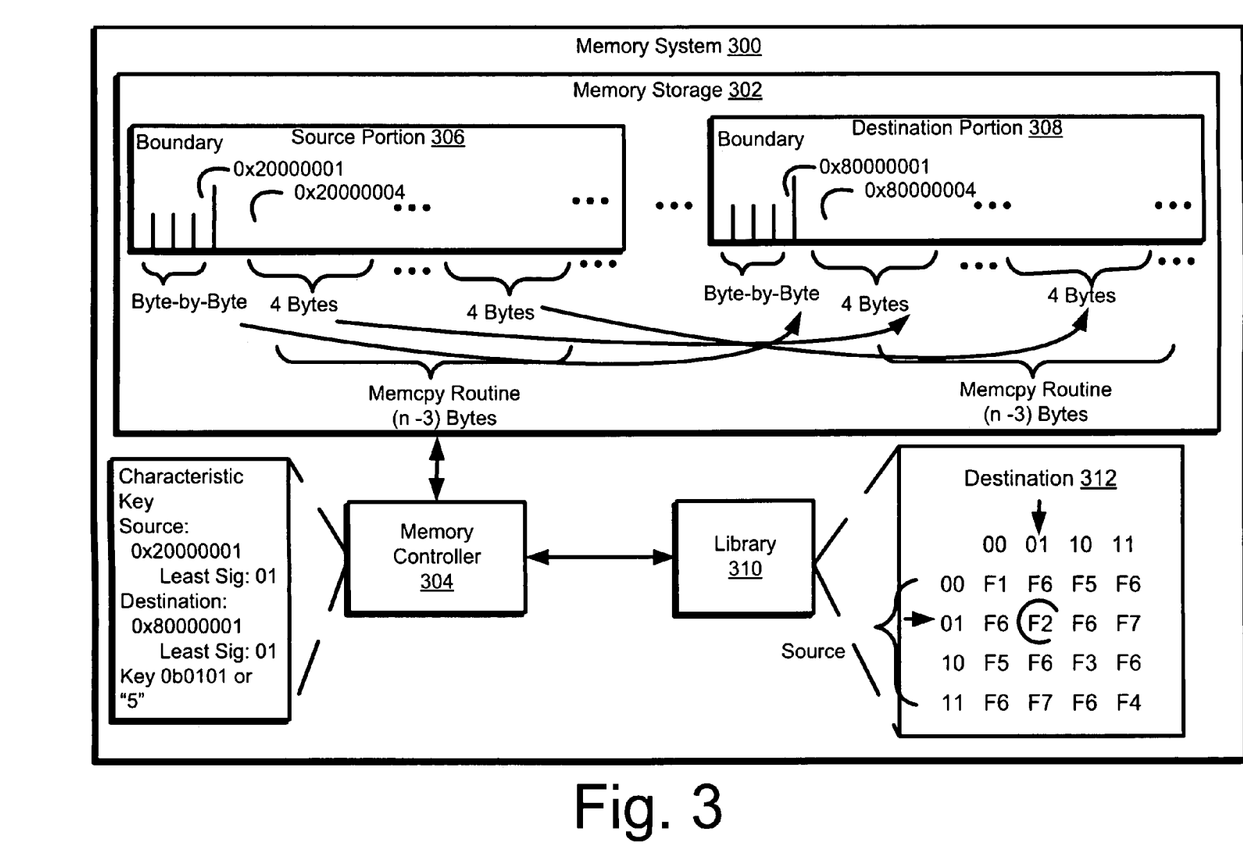
FIG. 3 illustrates a memory system in accordance with one or more embodiments for another set of conditions.

As illustrated in FIG. 3, the memory controller 304 can select a memory copy in an efficient manner. For a one byte over a four byte boundary alignment constraint or attribute (for a 32-bit bus), the memory controller 304 using the composed characteristic key 0b0101 or "5" can access a library 310 including a wrap function alignment matrix 312 for the wrap function which corresponds to the 0b0101 characteristic key. In Table 2, above, "01" for the source address component and "01" for the destination component corresponds to function "F2" which, in-turn, identifies the memory copy as read 3 bytes memcpy_align32, If, for example, the source address is 0x20000001 and the destination address is 0x80000001. In this way, the memory controller 304 initially duplicates and places three bytes on a byte-by-byte basis (for the misaligned source and destination addresses) in order to align the duplicated data. The memory controller 304 then calls on memcpy_align32 routine to duplicate and place the remaining (n−3) bytes, for a copy having "n" total bytes. The memory controller implementing the memory copy passes the next address as the starting address (original source address +3 as source address, original destination address as +3 as destination address, original n−3 as length to memcpy_align32) for the memory copy routine. In this instance, the starting address for the memcpy_align32 routine would be 0x20000004.

Example Method

Figure 4:
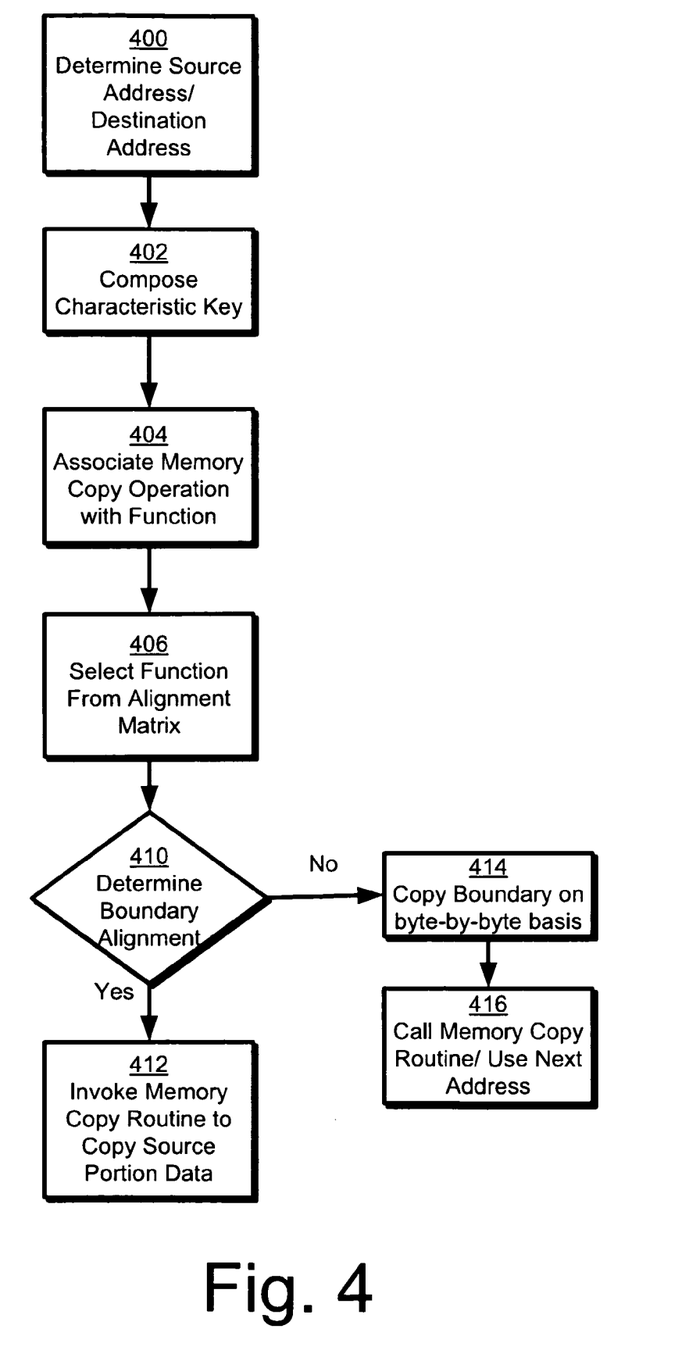
FIG. 4 is a flow diagram that describes a method in accordance with one embodiment.

FIG. 4 is a flow diagram that describes a method in accordance with one embodiment. The method can be implemented in connection with any suitable hardware, software, firmware, or combination thereof using one or more modules as previously described. For example, in at least some embodiments the method can be implemented, at least in part, by a memory system 100 such as that shown and described in FIG. 1.

At 400, the method determines a source address and a destination address for a memory copy. The individual addresses can comprise a series of bytes which uniquely identify either the location of the data being copied or the location to which data is to be placed. The determination can include determining the least significant bits for the source address and destination address.

At 402, the determined source address bits and destination address bits are used to compose a characteristic key. In one or more embodiments, the characteristic key includes bits representing the source address and the destination address. The characteristic key can be obtained by performing a mask function on the source and destination addresses to obtain the two least significant bits for the source address and the two least significant bits for the destination address. The respective least significant bits can be formed into a four bit characteristic key using a concatenation operation in which the characteristic key's two most significant bits are the source address' two least significant bits, while the characteristic key's two least significant bits are the two least significant bits from the destination address. As noted above, the characteristic key can be composed using "C" language.

In one or more embodiments, at 404, individual wrap functions identify or are otherwise associated with a contained memory copy that includes the memory copy routine. In specific implementations, function "1" identifies invoking memcpy_align32, while function "4" identifies memory copy "copy 1 byte" followed by a call to memory copy routine "memcpy_align3"2. Specific instances of memory copies which include memory copy routines and byte-by byte copies, if applicable, are illustrated in Table 1 above. Based on the disclosure and teachings provided herein, artisans will appreciate, the content and configuration of the wrap function alignment matrix including individual wrap functions can vary depending on the environment implementing the method. The individual wrap functions included in individual matrix cells may contain or wrap the alignment copy routine and a byte-by-byte copy for meeting an alignment constraint, when applicable.

At 406, a wrap function can be selected from the wrap function alignment matrix using the characteristic key. A wrap function allows for identification of the wrapped memory copy including a memory copy routine via the characteristic key. For example, characteristic key 0b1001 representing source address bits "10" and destination address bits "01" can be used to select function "6" or "F6" as the characteristic key is "1001" or "9".

The wrap function alignment matrix can be populated with wrap functions which identify individual memory copies based on boundary size, alignment and so on. To reduce processing overhead and time, the alignment matrix can be defined by a one-dimension array as provided above.

At 410, the alignment of the source address and the destination address on the word boundary can be determined from the wrap function and/or the contained memory copy. For instance, at 412, upon determining that the source address and the destination address are aligned, the memory storage source portion can be copied by invoking a memory copy routine identified by the wrap function. The memory copy routine may commence duplicating and placing data from the memory storage source portion to the memory storage destination portion, as the source address and the destination address are aligned. This indicates that the source portion and the destination portion are aligned.

If it is determined that the source address and the destination address are not aligned, at 414, initial boundary bytes can be copied on a byte-by-byte basis. Byte-by-byte copying can include duplicating a byte from a source portion and then placing the duplicated byte in a destination portion. Additional initial byte(s) can be copied in the same manner. Once the initial boundary bytes are duplicated and placed, at 416 the memory copy routine can be called on to copy the remaining data in the memory storage source portion by duplicating and placing the remaining data in the memory storage destination portion on a multiple byte basis.

Example Memory Controller Environments

Referring now to FIGS. 5-13, various example implementations of memory systems and/or memory controller environments are shown. The various memory system and/or memory controller environments can utilize the techniques and structures described above for performing a memory copy procedure.

Figure 5:
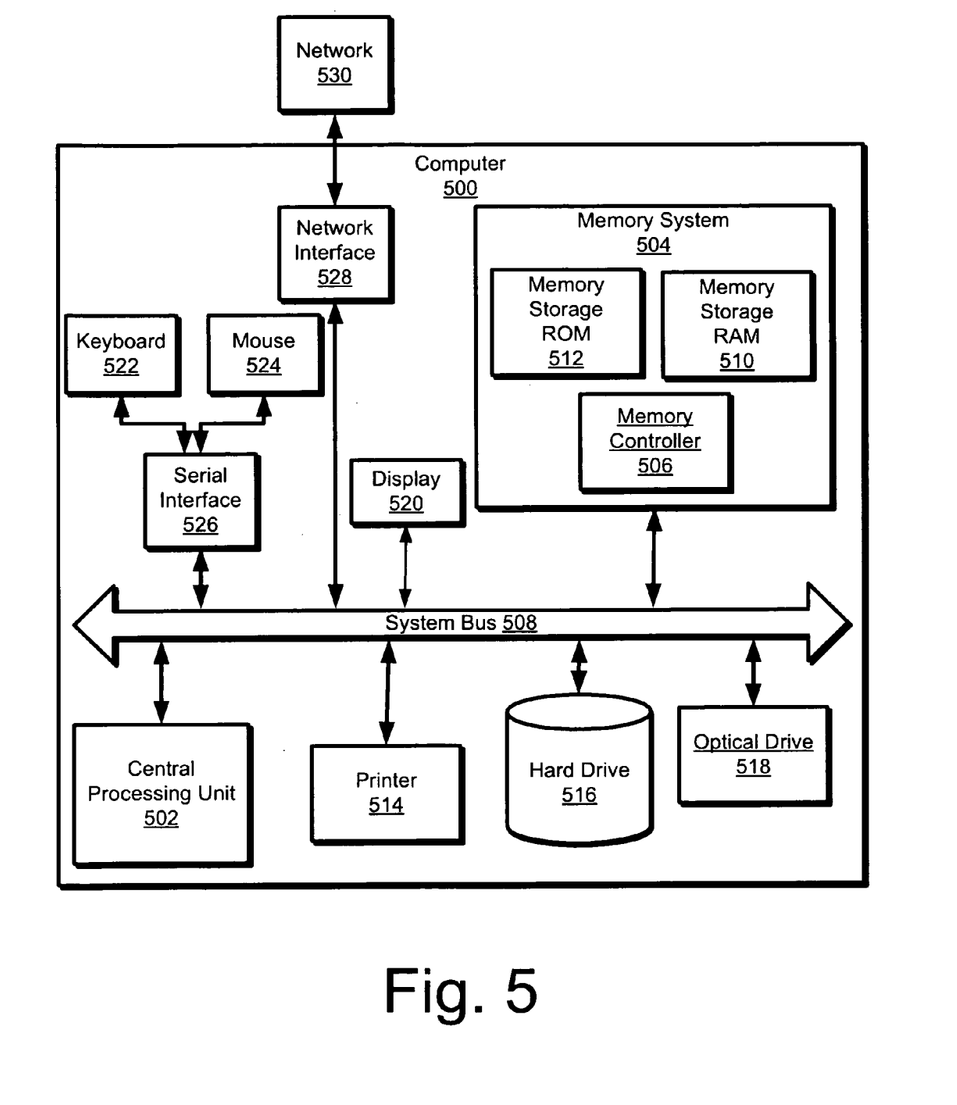
FIGS. 5-13 illustrate various implementations of example embodiments.

Referring to FIG. 5, a generalized example of a computer 500 environment is described. The following description is included to provide a brief general overview and is not to be taken as limiting or describing essential features. One or more processing units, such as a central processing unit (CPU) 502, are included in the computer. A memory system 504 including a memory controller 506, as discussed above, is coupled to the CPU via a system bus 508. While random access memory (RAM) memory storage 510 has been primarily discussed, the computer can include read only memory (ROM) memory storage 512, such as for containing BIOS information used by the CPU 502 during start-up. Suitable bus architectures include a memory bus for communication between the CPU and memory system 504 via memory controller 506, a peripheral bus for communication with peripheral devices, such as a printer 514. Additional hardware including mass data storage, e.g., a hard disk drive (HDD) 516 and an optical drive 518, e.g., a digital video disk (DVD) drive may be coupled to the CPU through respective drive interfaces. Input/out devices including displays 520, keyboards 522, mice 524 may be coupled via a video adapter in the former case and a serial interface 526 in the latter two cases. Example input/output interfaces include serial ports, parallel ports, universal serial buses (USB), video adapters. Other hardware can be included in a similar fashion. One or more network interfaces 528 can be included for communicating via one or more network(s) 530 with other systems and devices via local area networks, wide area networks. Communication can occur over hardwired communication links and wireless networks.

Figure 6:
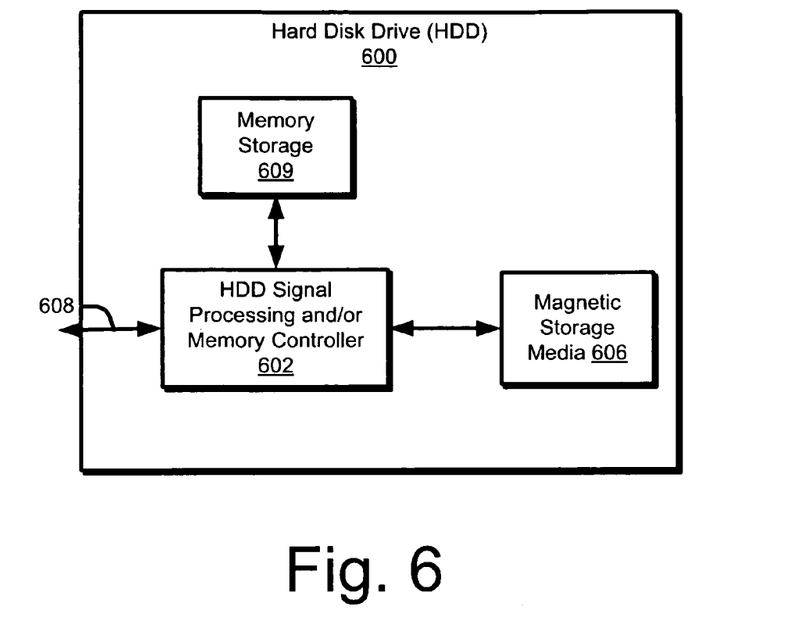

Referring to FIG. 6, an example memory system may be embodied in a hard disk drive (HDD) 600. In implementations, a memory controller may comprise part of the HDD's signal processing and/or control circuits which are generally identified at 602. In some implementations, signal processing and/or control circuit 602 and/or other circuits (not shown) in HDD 600 may process data, perform coding, decoding and/or encryption, perform calculations, and/or format data that is output to and/or received from a magnetic storage medium 606.

HDD 600 may communicate with a host device (not shown) such as a computer, mobile computing devices, e.g., as personal digital assistants, cellular phones, media or MP3 players and the like, and/or other devices via one or more wired or wireless communication links 608. In one or more other implementations HDD 600 may include memory storage 609, such as random access memory (RAM) including a memory controller included in memory system 609, a low-latency nonvolatile memory system may include flash memory, read only memory (ROM) and/or other suitable electronic memory storage. In embodiments, the memory controller can be included in a memory module including the memory storage 609 which can be included in the HDD 600. The HDD 600 can be included in the computer described in FIG. 5.

Figure 7:
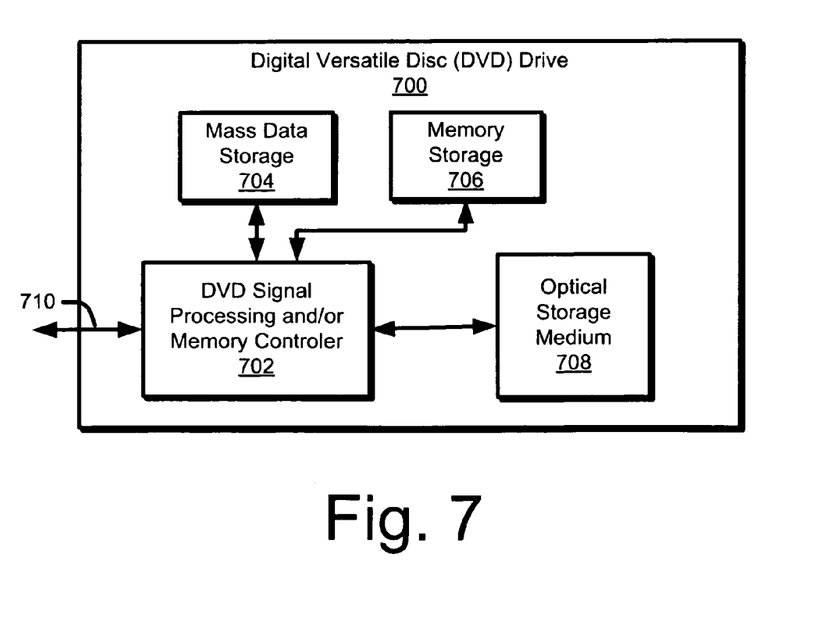

Referring now to FIG. 7, a memory system may be embodied in a digital versatile disc (DVD) drive 700. For example, memory control functions can be performed by part of the DVD's signal processing and/or control circuits, which are generally identified at 702. DVD drive 700 includes mass data storage 704, memory storage 706 and optical storage medium 708. Signal processing and/or control circuit 702 and/or other circuits (not shown) in DVD drive 700 may process data, perform coding, decoding and/or encryption, perform calculations, and/or format data that is read from and/or data written to an optical storage medium 708. In some implementations, signal processing and/or control circuit 702 and/or other circuits (not shown) in DVD drive 700 can also perform other functions such as encoding and/or decoding and/or any other signal processing functions associated with a DVD drive.

DVD drive 700 may communicate with an output device (not shown) such as a computer (as described above), television, or other device via one or more wired or wireless communication links 710. DVD drive 700 includes mass data storage 704 that stores data in a nonvolatile manner. Mass data storage 704 may include a hard disk drive (HDD) such as that shown in FIG. 5. The HDD may be a mini HDD that includes one or more platters having a diameter that is smaller than approximately 1.8". In one or more embodiments, DVD drive 700 can include memory storage 706, such as RAM, ROM, low latency nonvolatile memory such as flash memory storage, and/or other suitable electronic data storage. In embodiments, a memory controller can be included in a memory module including memory storage 706 which can be included in the DVD 700.

Figure 8:
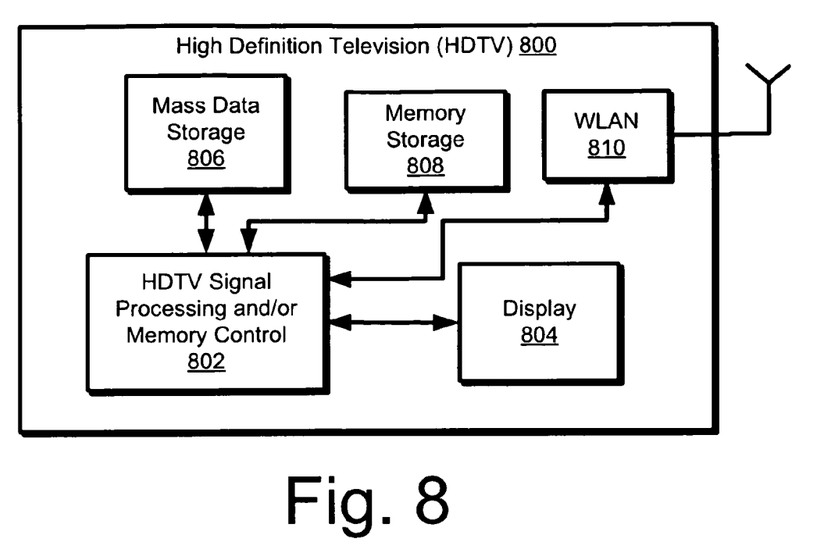

Referring now to FIG. 8, a memory system may be embodied in a high definition television (HDTV) 800 and may be implemented in either or both signal processing and/or control circuits, which are generally identified at 802, a wireless local area network (WLAN) interface 810 and/or mass data storage 806 of the HDTV 800. For instance, memory controller functions can be performed by the HDTV's signal processing and/or control circuits 802. HDTV 800 receives HDTV input signals in either a wired or wireless format and generates HDTV output signals for a display 804. In some implementations, signal processing circuit and/or control circuit 802 and/or other circuits (not shown) of HDTV 800 may process data, perform coding, decoding and/or encryption, perform calculations, format data, and/or perform any other type of HDTV processing that may be required.

HDTV 800 may include mass data storage 806, which stores data in a nonvolatile manner such as optical and/or magnetic storage devices. At least one magnetic storage device may have the configuration shown in FIG. 6 and/or at least one optical storage device may have the configuration shown in FIG. 7. The magnetic storage device may be a mini HDD that includes one or more platters having a diameter that is smaller than approximately 1.8". In one or more embodiments, HDTV 800 may also include memory storage 808, including a memory controller therein, such as RAM, ROM, low latency nonvolatile memory such as flash memory and/or other suitable electronic data storage. HDTV 800 also may support connections with a WLAN via a WLAN network interface 810. In embodiments, memory controller functions can be included in a memory module including the memory storage 808 which can be included in the HDTV 800.

Figure 9:
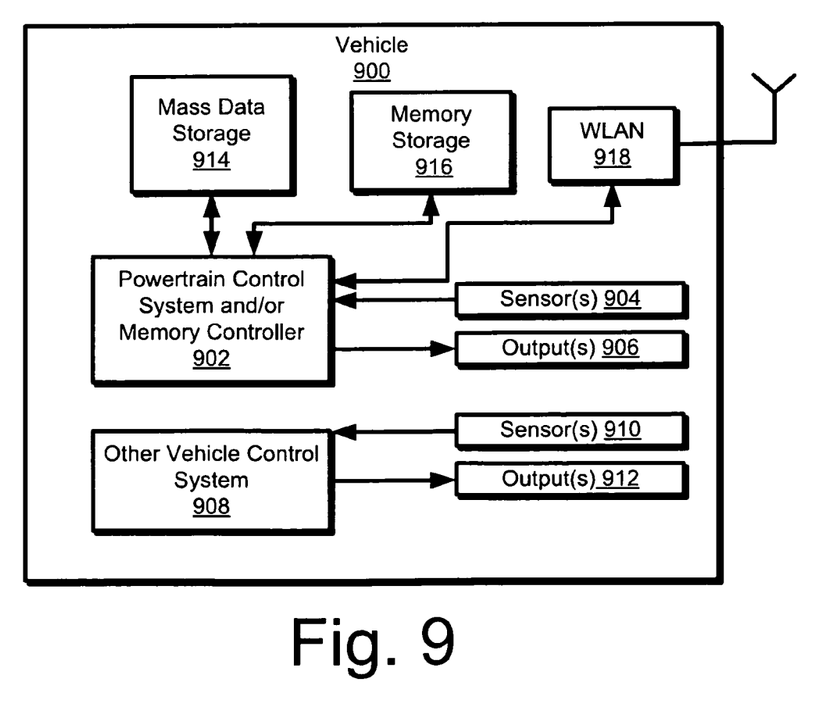

Referring now to FIG. 9, a memory system may be implemented as part of a communication system of a vehicle 900, a WLAN interface 918 and/or mass data storage 914 of the vehicle control system. In some implementations, a powertrain control system 902 receives inputs from one or more sensors 904 such as temperature sensors, pressure sensors, rotational sensors, airflow sensors, and/or any other suitable sensors that generate one or more output control signals 906, such as engine operating parameters, transmission operating parameters, and/or other control signals. The signal processing and/or control circuits 902 of the powertrain control system can be configured to function as a memory controller for performing the above described methods.

A memory system including a memory controller can be embodied in other control systems 908 of vehicle 900. Control system 908 may likewise receive signals from input sensors 910 and/or output control signals 912 to one or more output devices. In some implementations, control system 908 may be part of an anti-lock braking system (ABS), a navigation system, a telematics system, a vehicle telematics system, a lane departure system, an adaptive cruise control system, a vehicle entertainment system such as a stereo, DVD, compact disc, and the like.

Powertrain control system 902 may include mass data storage 914 that stores data in a nonvolatile manner. Mass data storage 914 may include optical and/or magnetic storage devices for example hard disk drives HDD and/or DVDs. At least one magnetic storage device may have the configuration shown in FIG. 6 and/or at least one optical storage device may have the configuration shown in FIG. 7. The magnetic storage device may be a mini HDD that includes one or more platters having a diameter that is smaller than approximately 1.8". Powertrain control system 902 may include memory storage 916 such as RAM, ROM, low latency nonvolatile memory such as flash memory, and/or other suitable electronic data storage. In one or more embodiments, the memory controller can be included in a memory module including memory storage 916 which can be included in the vehicle 900. Powertrain control system 902 also may support connections with a WLAN via a WLAN network interface 918. The control system 908 may also include mass data storage, memory, and/or a WLAN interface (all not shown).

Figure 10:
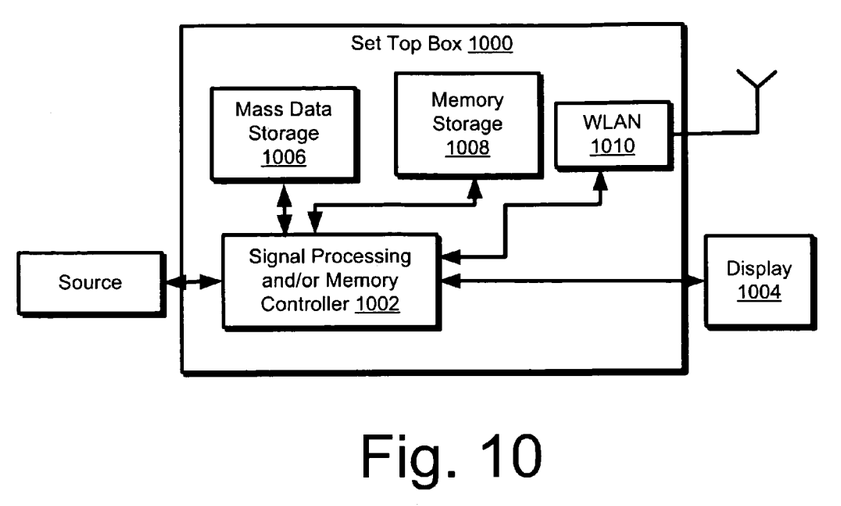

Referring now to FIG. 10, a memory system may be embodied in a set top box 1000, which may be implemented by either or both signal processing and/or control circuits, which are generally identified at 1002, a WLAN interface 1010, and/or mass data storage 1006 of the set top box 1000. The signal processing and/or control circuits 1002 can be configured to function as a memory controller for controlling memory storage 1008. Set top box 1000 receives signals from a source such as a broadband source and outputs standard and/or high definition audio/video signals suitable for a display 1004 such as a television and/or monitor and/or other video and/or audio output devices. Signal processing and/or control circuits 1002 and/or other circuits (not shown) of the set top box 1000 may process data, perform coding, decoding and/or encryption, perform calculations, format data, and/or perform any other set top box function.

Set top box 1000 may include a mass data storage 1006 that stores data in a nonvolatile manner. Mass data storage 1006 may include optical and/or magnetic storage devices for example hard disk drives HDD and/or DVDs. At least one magnetic storage device may have the configuration shown in FIG. 6 and/or at least one optical storage device may have the configuration shown in FIG. 7. The magnetic storage device may be a mini HDD that includes one or more platters having a diameter that is smaller than approximately 1.8". Set top box 1000 may be connected to memory storage 1008 such as RAM, ROM, low latency nonvolatile memory such as flash memory and/or other suitable electronic data storage. In one or more other embodiments, the memory controller can be included in a memory module including the memory storage 1008 which can be included in the set top box 1000. Set top box 1000 also may support connections with a WLAN via a WLAN network interface 1010.

Figure 11:
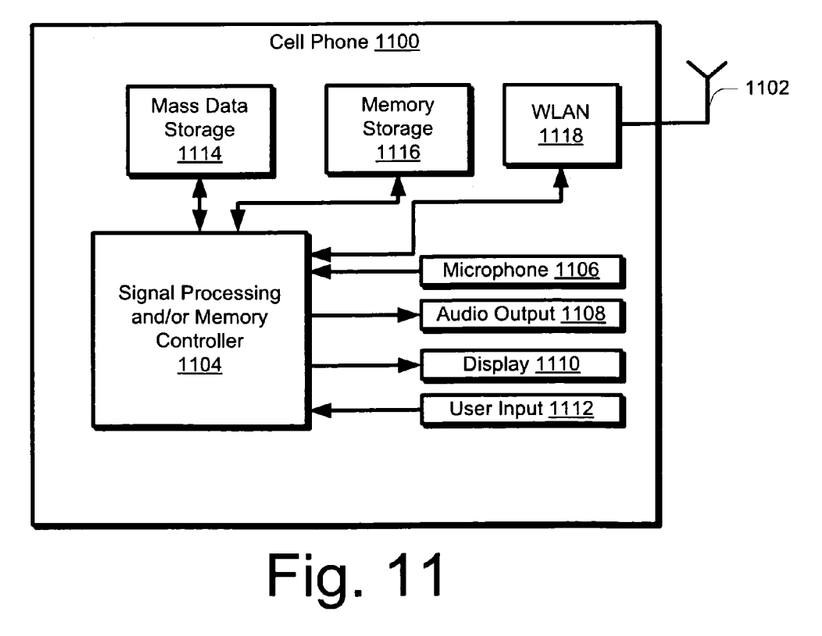

Referring now to FIG. 11, a memory system including a memory controller may be embodied in a cellular phone 1100 that may include a cellular antenna 1102. The memory system's memory control functions, may be implemented in connection with either or both signal processing and/or control circuits, which are generally identified at 1104, a WLAN interface 1118, and/or mass data storage of the cellular phone 1100. The signal processing and/or control circuits may function to control the memory storage 1116 as well. In some implementations, cellular phone 1100 includes a microphone 1106, an audio output 1108 such as a speaker and/or audio output jack, a display 1110 and/or an input device 1112 such as a keypad, pointing device, voice actuation, and/or other input device. Signal processing and/or control circuits 1104 and/or other circuits (not shown) in cellular phone 1100 may process data, perform coding, decoding and/or encryption, perform calculations, format data, and/or perform other cellular phone functions.

Cellular phone 1100 may include mass data storage 1114, which stores data in a nonvolatile manner such as optical and/or magnetic storage devices for example hard disk drives HDD and/or DVDs. At least one magnetic storage device may have the configuration shown in FIG. 6 and/or at least one optical storage device may have the configuration shown in FIG. 7. The magnetic storage device may be a mini HDD that includes one or more platters having a diameter that is smaller than approximately 1.8". Cellular phone 1100 may be connected to memory storage 1116 such as RAM, ROM, low latency nonvolatile memory such as flash memory, and/or other suitable electronic data storage. In embodiments, the memory controller can be included in a memory module including the memory storage 1116 which can be included in the cell phone 1100. Cellular phone 1100 also may support connections with a WLAN via a WLAN network interface 1118.

Figure 12:
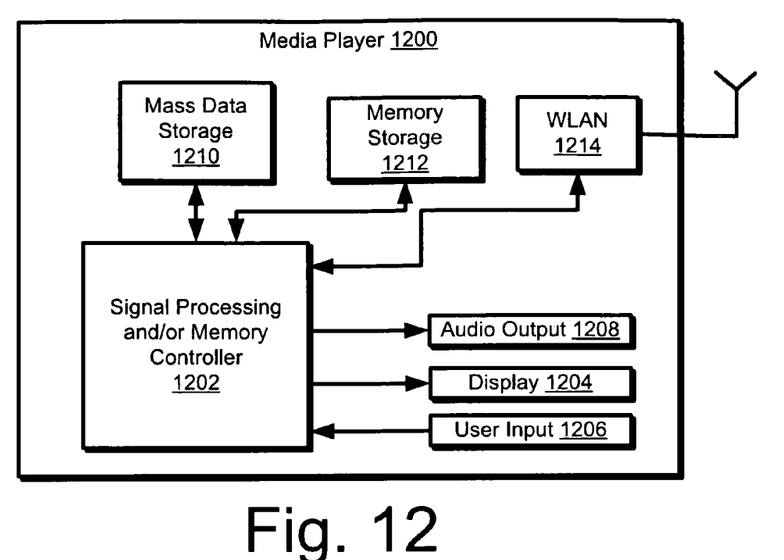

Referring now to FIG. 12, a memory system may be embodied in a media player 1100 and may be implemented in connection with either or both signal processing and/or control circuits, which are generally identified at 1202, a WLAN interface 1214, and/or mass data storage 1210 of the media player 1200. The media player's processing and/or control circuits 1202 may also control memory storage 1212. In some implementations, media player 1200 includes a display 1204 and/or a user input 1206 such as a keypad, touchpad, and the like. In some implementations, media player 1200 may employ a graphical user interface (GUI) that typically employs menus, drop down menus, icons, and/or a point-and-click interface via display 1204 and/or user input 1206. Media player 1200 further includes an audio output 1208 such as a speaker and/or audio output jack. Signal processing and/or control circuits 1202 and/or other circuits (not shown) of media player 1200 may process data, perform coding, decoding and/or encryption, perform calculations, format data, and/or perform any other media player function.

Media player 1200 may include mass data storage 1210 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one magnetic storage device may have the configuration shown in FIG. 6 and/or at least one optical storage device may have the configuration shown in FIG. 7. The magnetic storage device may be a mini HDD that includes one or more platters having a diameter that is smaller than approximately 1.8". Media player 1100 may be connected to memory storage 1212 such as RAM, ROM, low latency nonvolatile memory such as flash memory, and/or other suitable electronic data storage. In embodiments, the memory controller can be included in a memory module including the memory storage 1212 which can be included in the media player 1200. Media player 1200 also may support connections with a WLAN via a WLAN network interface 1214.

Figure 13:
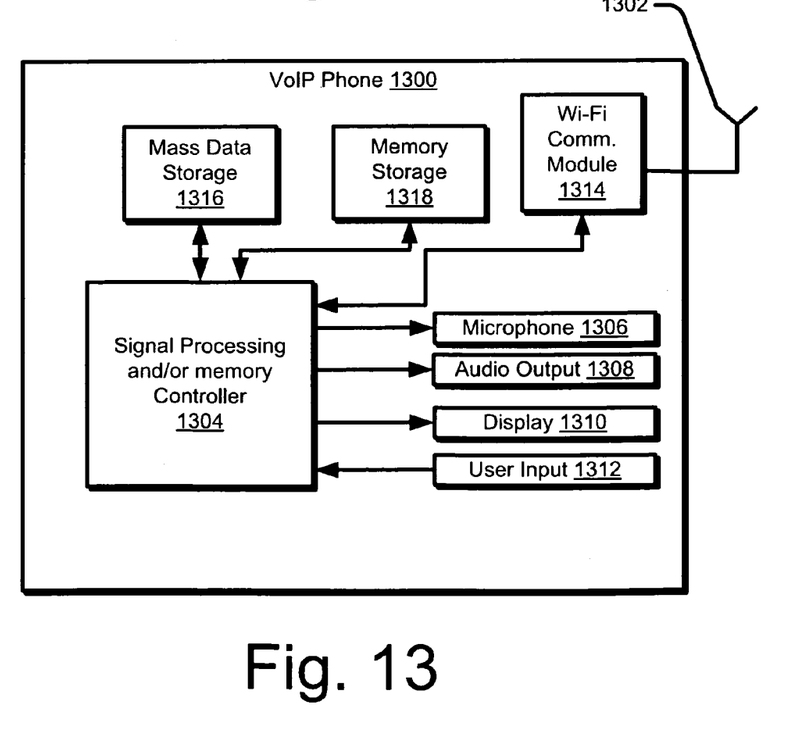

Referring to FIG. 13, a memory system may be embodied in connection with a Voice over Internet Protocol (VoIP) phone 1300 that may include an antenna 1302 or, alternately or additionally, in connection with a VoIP box that enables a conventional telephone to be plugged in and utilized with VoIP technology. The receiver may be implemented in connection with either or both signal processing and/or control circuits, which are generally identified at 1304, a wireless interface 1314, and/or mass data storage 1316 of the VoIP phone 1300. In instances, the signal processing and/or control circuits 1304 can function as a memory controller for controlling data storage within memory storage 1318. In some implementations, VoIP phone 1300 includes, in part, a microphone 1306, an audio output 1308 such as a speaker and/or audio output jack, a display monitor 1310, a user input device 1312 such as a keypad, pointing device, voice actuation, and/or other input devices, and a Wireless Fidelity (Wi-Fi) communication module 1314. Signal processing and/or control circuits 1304 and/or other circuits (not shown) in VoIP phone 1300 may process data, perform coding, decoding and/or encryption, perform calculations, format data, and/or perform other VoIP phone functions.

VoIP phone 1300 may include mass data storage 1316 that stores data in a nonvolatile manner such as optical and/or magnetic storage devices, for example hard disk drives HDD and/or DVDs. At least one magnetic storage device may have the configuration shown in FIG. 6 and/or at least one optical storage device may have the configuration shown in FIG. 7. The magnetic storage device may be a mini HDD that includes one or more platters having a diameter that is smaller than approximately 1.8". VoIP phone 1300 may be connected to memory storage 1318, which may be RAM, ROM, low latency nonvolatile memory such as flash memory, and/or other suitable electronic data storage. In embodiments, the memory controller can be included in a memory module including the memory storage 1318 which can be included in the VoIP phone 1200. VoIP phone 1300 is configured to establish communications link with a VoIP network (not shown) via Wi-Fi communication module 1314. Still other implementations in addition to those described above are contemplated.

Still other implementations in addition to those described above are contemplated.

CONCLUSION

In the various embodiments, hardware, software, firmware and methods use an alignment matrix and characteristic key for selecting a memory copy. Specifically, in at least some embodiments, a characteristic key representing the source address and the destination address is used to streamline selection of a wrap function. The wrap function identifies the wrapped memory copy routine for use in copying the data. Based on the alignment constraint for the memory copy, bytes may be copied on a byte-by-byte basis for the first bytes, as applicable, and the memory copy routine called on to copy the remaining data. If the alignment constraint permits, the routine can be invoked without a byte-by-byte copy. As a result overhead associated with determining which memory copy to use can be reduced and the overall memory copy delay is reduced.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A memory controller implemented at least partially in hardware and comprising one or more modules to:
   compose a characteristic key from a source address and a destination address for a memory copy; and
   invoke, from a set of different copy routines, a memory copy routine to perform the memory copy, at least one of the different copy routines configured to copy a mis-aligned byte on a byte-by-byte basis and copy aligned bytes on a multi-byte basis, the memory copy routine invoked by referencing, based on the characteristic key, an alignment matrix associated with the set of different copy routines.

2. The memory controller of claim 1, wherein the characteristic key is a four bit value in which the characteristic key's most significant two bits are the source addresses' two least significant bits and the characteristic key's least significant two bits are the destination address' two least significant bits.

3. The memory controller of claim 1, wherein the characteristic key is composed using a mask operation and a concatenation operation.

4. The memory controller of claim 1, wherein the characteristic key includes four bits including two bits derived from the destination address and two bits derived from the source address.

5. The memory controller of claim 1, wherein the one or more modules are further configured to:
determine, based on a word boundary, an alignment of the source address and the destination address; and
when the source address and the destination address are misaligned and in response to invoking the memory copy routine:
copy word boundary bytes on a byte-by-byte basis; and
after the word boundary bytes are copied, call a multi-byte memory copy sub-routine using a next source address and a next destination address as a starting address for the multi-byte memory copy sub-routine.

6. The memory controller of claim 1, wherein the alignment matrix is a one-dimension array.

7. The memory controller of claim 1, wherein the one or more modules are further configured to align the source address and the destination address on a word boundary.

8. A method comprising:
composing a characteristic key from a source address and a destination address for a memory copy; and
invoking, from a set of different copy routines, a memory copy routine to perform the memory copy, at least one of the different copy routines configured to copy a misaligned byte on a byte-by-byte basis and copy aligned bytes on a multi-byte basis, the memory copy routine invoked by referencing, based on the characteristic key, an alignment matrix associated with the set of different copy routines.

9. The method of claim 8, wherein the characteristic key is a four bit value in which the characteristic key's most significant two bits are the source addresses' two least significant bits and the characteristic key's least significant two bits are the destination address' two least significant bits.

10. The method of claim 8, wherein the characteristic key is composed using a mask operation and a concatenation operation.

11. The method of claim 8, wherein the characteristic key includes four bits including two bits derived from the destination address and two bits derived from the source address.

12. The method of claim 8, further comprising:
determining, based on a word boundary, an alignment of the source address and the destination address; and
when the source address and the destination address are misaligned and in response to invoking the memory copy routine:
copying word boundary bytes on a byte-by-byte basis; and
after the word boundary bytes are copied, calling a multi-byte memory copy sub-routine using a next source address and a next destination address as a starting address for the multi-byte memory copy sub-routine.

13. The method of claim 8, wherein the alignment matrix is a one-dimension array.

14. The method of claim 8, further comprising aligning the source address and the destination address on a word boundary.

15. One or more computer-readable memory devices having instructions that are executable to:
compose a characteristic key from a source address and a destination address for a memory copy; and
invoke, from a set of different copy routines, a memory copy routine to perform the memory copy, at least one of the different copy routines configured to copy a misaligned byte on a byte-by-byte basis and copy aligned bytes on a multi-byte basis, the memory copy routine invoked by referencing, based on the characteristic key, an alignment matrix associated with the set of different copy routines.

16. One or more computer-readable memory devices of claim 15, wherein the characteristic key is a four bit value in which the characteristic key's most significant two bits are the source addresses' two least significant bits and the characteristic key's least significant two bits are the destination address' two least significant bits.

17. One or more computer-readable memory devices of claim 15, wherein the characteristic key is composed using a mask operation and a concatenation operation.

18. One or more computer-readable memory devices of claim 15, wherein the characteristic key includes four bits including two bits derived from the destination address and two bits derived from the source address.

19. One or more computer-readable memory devices of claim 15, wherein the instructions are further executable to:
determine, based on a word boundary, an alignment of the source address and the destination address; and
when the source address and the destination address are misaligned and in response to invoking the memory copy routine:
copy word boundary bytes on a byte-by-byte basis; and
after the word boundary bytes are copied, call a multi-byte memory copy sub-routine using a next source address and a next destination address as a starting address for the multi-byte memory copy sub-routine.

20. One or more computer-readable memory devices of claim 15, wherein the alignment matrix is a one-dimension array.

21. One or more computer-readable memory devices of claim 15, wherein the instructions are further executable to align the source address and the destination address on a word boundary.

22. A system comprising:
means for storing data in an addressable manner; and
means for controlling the means for storing, the means for controlling being configured to:
compose a characteristic key from a source address and a destination address data for a memory copy; and
invoke, from a set of different copy routines including at least one copy routine configured to copy a misaligned byte on a byte-by-byte basis and copy aligned bytes on a multi-byte basis, a memory copy routine by referencing, based on the characteristic key, an alignment matrix associated with the set of different copy routines.

23. The system of claim 22 wherein the characteristic key is composed of four bits in which the characteristic key's two most significant bits are the source address' two least significant bits and the characteristic key's two least significant bits are the destination address' two least significant bits.

24. The system of claim 22, wherein the characteristic key is composed using a mask operation and a concatenation operation.

25. The system of claim 22 wherein the means for controlling is to:

determine, based on a word boundary, an alignment of the source address and the destination address based on the source address and the destination address;

for a misaligned source address and destination address, copy word boundary bytes on a byte-by-byte basis; and call a multi-byte memory copy sub-routine using a next source address and a next destination address after the copy word boundary bytes as a starting address for the multi-byte memory copy sub-routine.

* * * * *